(12) United States Patent
Li

(10) Patent No.: US 12,719,335 B2
(45) Date of Patent: Aug. 25, 2026

(54) TRANSMISSION MECHANISM HAVING COOLING FLOW PATH AND E-AXLE DRIVING SYSTEM

(71) Applicant: Schaeffler Technologies AG & Co. KG, Herzogenaurach (DE)

(72) Inventor: Xin Li, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 316 days.

(21) Appl. No.: 18/703,520

(22) PCT Filed: Oct. 22, 2021

(86) PCT No.: PCT/CN2021/125563
§ 371 (c)(1),
(2) Date: Apr. 22, 2024

(87) PCT Pub. No.: WO2023/065282
PCT Pub. Date: Apr. 27, 2023

(65) Prior Publication Data
US 2025/0239916 A1 Jul. 24, 2025

(51) Int. Cl.
*H02K 9/19* (2006.01)
*B60K 1/00* (2006.01)
*H02K 7/00* (2006.01)

(52) U.S. Cl.
CPC ................ *H02K 9/19* (2013.01); *B60K 1/00* (2013.01); *H02K 7/003* (2013.01); *B60K 2001/006* (2013.01)

(58) Field of Classification Search
CPC ............ H02K 9/005; H02K 9/19; H02K 9/10; H02K 7/003; H02K 19/19; H02K 19/193;
(Continued)

(56) References Cited

U.S. PATENT DOCUMENTS 3,189,769 A * 6/1965 Willyoung ............ H02K 9/225 310/52
3,462,625 A * 8/1969 Endress .................. H02K 1/32 310/61
(Continued)

FOREIGN PATENT DOCUMENTS

CN 103597716 A 2/2014
CN 111674258 A 9/2020
(Continued)

*Primary Examiner* — Maged M Almawri
(74) *Attorney, Agent, or Firm* — Volpe Koenig

(57) ABSTRACT

A transmission mechanism having a cooling flow path, including a shaft assembly, an inner cylinder, a first sealing ring, and a second sealing ring. The first sealing ring is located in a gap between one axial end portion of the inner cylinder and the shaft assembly, and the second sealing ring is located in a gap between the other axial end portion of the inner cylinder and the shaft assembly, so that a cooling medium entering from the inlet of the shaft assembly can flow through a central hole, a communication hole, an intermediate space, and a discharge hole, and then is discharged to the outside of the shaft assembly. Therefore, interference fit does not need to be performed between the two axial end portions of the inner cylinder and the shaft assembly, and the cooling flow path can be realized in the transmission mechanism, thereby reducing the machining precision of a corresponding component, and being further capable of simplifying an assembling process and shortening the assembling duration. Further, provided is an e-axle driving system comprising the transmission mechanism.

16 Claims, 6 Drawing Sheets

(58) Field of Classification Search
CPC ...... H02K 9/16–197; H02K 1/32; H02K 5/12; H02K 5/15; H02K 5/163; H02K 5/20; H02K 7/085; H02K 7/02; H02K 7/025; F16F 15/30; F16F 15/302; Y02E 60/16
USPC ........... 310/74, 63, 64, 153, 216.119, 52–62, 310/60 A
See application file for complete search history.

(56) References Cited

U.S. PATENT DOCUMENTS 3,521,094 A * 7/1970 Widder .................. H02K 9/197 310/58
4,203,044 A * 5/1980 Linscott, Jr. .............. F16C 3/00 310/68 D
4,303,842 A * 12/1981 Nathenson ............... H02K 3/22 310/201
4,315,172 A * 2/1982 Intichar .................. H02K 9/225 310/64
4,467,229 A * 8/1984 Ogita ....................... H02K 9/12 310/157
5,189,325 A * 2/1993 Jarczynski ............. H02K 9/197 310/61
5,424,593 A * 6/1995 Vaghani ............... H02K 11/042 310/68 D
6,232,691 B1 * 5/2001 Anderson .............. H02K 29/10 310/179
6,734,585 B2 * 5/2004 Tornquist ............... H02K 1/325 310/58
6,750,572 B2 * 6/2004 Tornquist ................. H02K 9/19 310/58
6,897,581 B2 * 5/2005 Doherty ................. H02K 19/38 310/59
7,489,057 B2 * 2/2009 Zhou ...................... H02K 9/197 310/61
7,834,492 B2 * 11/2010 Iund ......................... H02K 9/19 310/58
8,004,140 B2 * 8/2011 Alexander ........... H02K 1/2773 310/216.057
8,786,154 B2 * 7/2014 Kim ....................... H02K 1/276 310/156.09
8,970,074 B2 * 3/2015 Wagner .................. H02K 7/003 310/59
10,135,319 B2 * 11/2018 Hanumalagutti ........ B60K 1/00
10,326,334 B2 * 6/2019 Larjola ................ H02K 7/1823
10,630,134 B2 * 4/2020 Goldstein .............. H02K 5/203
10,826,363 B2 * 11/2020 Huang ............... H02K 15/0407
2003/0030333 A1 * 2/2003 Johnsen ................... H02K 1/32 310/54
2004/0080218 A1 * 4/2004 Weidman ................. H02K 1/32 310/61
2006/0082228 A1 * 4/2006 Urbahn .................... H02K 9/20 62/50.7
2008/0272661 A1 11/2008 Zhou et al.
2009/0261667 A1 * 10/2009 Matsubara ........... H02K 1/2766 310/54
2012/0205996 A1 * 8/2012 Buttner .................. H02K 9/225 310/54
2012/0213460 A1 * 8/2012 Radinger ................ F16C 19/54 384/477
2012/0299404 A1 * 11/2012 Yamamoto ............... H02K 1/28 310/61
2013/0002064 A1 * 1/2013 De Bock ................ H02K 9/197 310/54
2013/0038151 A1 * 2/2013 Ohashi ................... H02K 7/086 310/59
2013/0057117 A1 * 3/2013 Suzuki ................. B60K 7/0007 310/60 R
2013/0221772 A1 * 8/2013 Miyamoto ............... H02K 9/19 310/54
2013/0257196 A1 * 10/2013 Yamamoto ............... H02K 9/19 310/54
2013/0313938 A1 * 11/2013 Yamada ................. H02K 16/02 310/156.69
2013/0334912 A1 * 12/2013 Tokunaga ................ H02K 9/19 310/54
2014/0042841 A1 * 2/2014 Rippel .................. H02K 9/193 310/54
2014/0124172 A1 * 5/2014 Veltri ..................... H02K 5/203 165/104.19
2014/0333163 A1 * 11/2014 Horii ........................ H02K 9/10 310/59
2015/0042185 A1 * 2/2015 Buttner .................. H02K 9/193 310/54
2015/0288255 A1 * 10/2015 Barker ................. H02K 1/2781 310/43
2016/0036276 A1 * 2/2016 Yamagishi ............... H02K 1/22 310/59
2016/0164378 A1 * 6/2016 Gauthier .................. H02K 9/19 310/54
2016/0301268 A1 * 10/2016 Watanabe ............ H02K 1/2706
2018/0198331 A1 * 7/2018 Sano ...................... H02K 1/276
2019/0068012 A1 * 2/2019 Yazaki ................... H02K 1/276
2019/0207447 A1 * 7/2019 Swales ................. H02K 1/2766
2019/0267859 A1 * 8/2019 Kitahara ................ H02K 1/276
2020/0036249 A1 * 1/2020 Krais ..................... H02K 9/197
2020/0136451 A1 * 4/2020 Zeichfüssl ................ F03D 9/25
2020/0153296 A1 * 5/2020 Albieri ................. H02K 1/2766
2020/0186007 A1 * 6/2020 Kitao ..................... H02K 15/03
2020/0274411 A1 * 8/2020 Kimoto .................. H02K 1/276
2020/0282822 A1 * 9/2020 Oh ......................... H02K 7/085
2020/0328657 A1 * 10/2020 Jung ...................... H02K 11/21
2020/0366158 A1 * 11/2020 Morishita ............ B62D 5/0403
2021/0111614 A1 * 4/2021 Fratila ...................... H02K 1/16
2021/0119508 A1 * 4/2021 Remboski ................ H02K 1/14
2021/0135533 A1 * 5/2021 Samie .................... H02K 1/276

FOREIGN PATENT DOCUMENTS

CN 112467911 A 3/2021
CN 113206563 A 8/2021
WO 2020094510 A1 5/2020

* cited by examiner

TRANSMISSION MECHANISM HAVING COOLING FLOW PATH AND E-AXLE DRIVING SYSTEM

CROSS-REFERENCE TO RELATED APPLICATIONS

This application is the U.S. National Phase of PCT Appln. No. PCT/CN2021/125563, filed Oct. 22, 2021, the entire disclosure of which is incorporated by reference herein.

TECHNICAL FIELD

The present application relates to the field of motive power systems for vehicles, and in particular to a transmission mechanism for a vehicle having a cooling flow path and an e-axle driving system including the same.

BACKGROUND

In a pure electric vehicle, a motor is used as a motive power source, and a so-called e-axle driving system is composed of the motor and a transmission. In the above-mentioned e-axle driving system, a rotor of the motor and the transmission are in transmission connection via a transmission mechanism including a shaft assembly. In order to cool the rotor of the motor, oil at a position where the transmission is located can be transmitted to a position where the rotor of the motor is located via the shaft assembly for cooling, and the oil can then be transmitted back to the position where the transmission is located. However, components of the shaft assembly for realizing this function need high machining accuracy, and the assembly process thereof is complicated and takes a long time.

SUMMARY

It is an object of the present application to provide a transmission mechanism having a cooling flow path. The transmission mechanism overcomes the problems of high machining accuracy, complicated assembly process and long assembly time caused by interference fit among an inner cylinder of a shaft assembly and other components. It is another object of the present application to provide an e-axle driving system including the above-mentioned transmission mechanism.

In order to achieve the above-mentioned objects, the following technical solutions are provided according to the present application.

A transmission mechanism having a cooling flow path is provided according to the present application, which includes:

- a shaft assembly, where a shaft hole and a discharge hole are formed in the shaft assembly, the shaft hole extends along an axial direction of the shaft assembly, an inlet of the shaft hole is formed at one axial end portion of the shaft assembly, and the discharge hole extends through a wall of the shaft hole,
- an inner cylinder, where the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along the axial direction of the inner cylinder and is in communication with the inlet, and the communication hole extends through a wall of the central hole; and

- a first sealing ring and a second sealing ring, where the first sealing ring is located in a gap between one axial end portion of the inner cylinder and the shaft assembly, and the second sealing ring is located in a gap between the other axial end portion of the inner cylinder and the shaft assembly,
- where the intermediate space is in communication with a space outside the shaft assembly through the discharge hole, and the central hole is in communication with the intermediate space through the communication hole, so that a cooling medium entering from the inlet can be discharged out of the shaft assembly through the central hole, the communication hole, the intermediate space and the discharge hole.

In an alternative solution, a first stepped structure is formed on the outer circumferential wall at the one axial end portion of the inner cylinder, and the first sealing ring is located at the first stepped structure; and/or, a second stepped structure is formed on the outer circumferential wall at the other axial end portion of the inner cylinder, and the second sealing ring is located at the second stepped structure.

In another alternative solution, the inner cylinder is arranged coaxially with the shaft assembly.

In another alternative solution, the shaft assembly includes a main shaft and a shaft cap, where a main shaft through-hole extending along the axial direction of the main shaft is formed in the main shaft, and an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

In another alternative solution, the main shaft through-hole includes a first axial section, an intermediate section and a second axial section which are arranged from the one axial end portion of the main shaft to the other axial end portion of the main shaft and are in communication with one another, and a cross-sectional area of the main shaft through-hole increases in a listed sequence of the first axial section, the intermediate section and the second axial section,

- the discharge hole is in communication with the intermediate section, a part of the inner cylinder including the one axial end portion extends into the intermediate section, and the first sealing ring is closer to the one axial end portion of the main shaft than the discharge hole.

In another alternative solution, a shaft cap blind hole in communication with the main shaft through-hole is formed in the shaft cap, a part of the inner cylinder including the other axial end portion extends into the shaft cap blind hole, the communication hole is located in the shaft cap blind hole, and the second sealing ring is farther away from the one axial end portion of the main shaft than the communication hole.

In another alternative solution, a gap is formed, in a radial direction, between the part of the inner cylinder including the one axial end portion and the main shaft, and another gap is formed, in the radial direction, between the part of the inner cylinder including the other axial end portion and the shaft cap.

An e-axle driving system is further provided according to the present application, which includes the above-mentioned transmission mechanism having the cooling flow path according to any one of the preceding technical solutions.

In an alternative solution, the e-axle driving system further includes a housing, a transmission and a motor, where the housing includes a first space and a second space spaced from each other, the transmission is accommodated in the first space, the motor is accommodated in the second space, both the inlet and the discharge hole are located in the first space, and a rotor of the motor is anti-torsion connected with a part of the transmission mechanism located in the second space.

In another alternative solution, at a part corresponding to the second axial section of the main shaft through-hole, the main shaft of the transmission mechanism is anti-torsion connected with the rotor of the motor.

By using the preceding technical solutions, the novel transmission mechanism having the cooling flow path and the e-axle driving system including the transmission mechanism are provided according to the present application. The transmission mechanism includes the shaft assembly, the inner cylinder and two sealing rings which are assembled together. The shaft hole and the discharge hole are formed in the shaft assembly, the shaft hole extends along the axial direction of the shaft assembly, the inlet of the shaft hole is formed at the one axial end portion of the shaft assembly, and the discharge hole extends through the wall of the shaft hole. The inner cylinder is accommodated in the shaft hole, the intermediate space is formed between the outer circumferential wall of the inner cylinder and the inner circumferential wall of the shaft assembly, the central hole and the communication hole are formed in the inner cylinder, the central hole extends along the axial direction of the inner cylinder and is in communication with the inlet, and the communication hole extends through the wall of the central hole. One of the two sealing rings is located in the gap between the one axial end portion of the inner cylinder and the shaft assembly, and the other one of the two sealing rings is located in the gap between the other axial end portion of the inner cylinder and the shaft assembly. In this way, the intermediate space is in communication with a space outside the shaft assembly through the discharge hole, and the central hole is in communication with the intermediate space through the communication hole, so that a cooling medium entering from the inlet can be discharged out of the shaft assembly through the central hole, the communication hole, the intermediate space and the discharge hole.

In the transmission mechanism, by providing the sealing rings, the cooling flow path can be realized in the transmission mechanism without interference fit between the two axial end portions of the inner cylinder and the shaft assembly, so that the machining accuracy of corresponding parts of the two axial end portions of the inner cylinder and the shaft assembly can be reduced, the assembly process can be simplified and the assembly time can be shortened while achieving the same function. Further, the e-axle driving system including the above-mentioned transmission mechanism has the same beneficial effects.

DESCRIPTION OF REFERENCE NUMERALS

Figure 1A:
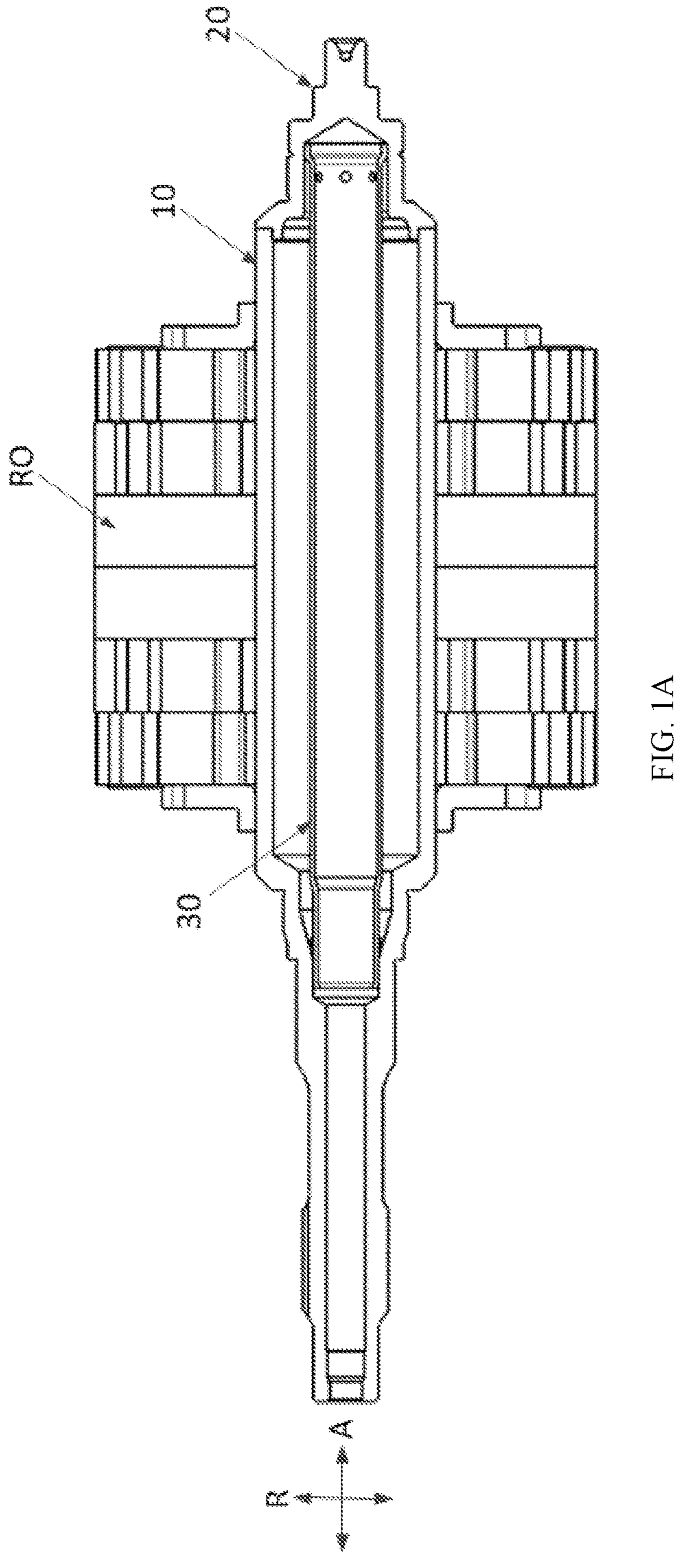
FIG. 1A is a schematic cross-sectional view showing a partial structure of a possible e-axle driving system, where a rotor of a motor and a transmission mechanism are shown in an assembled state.

10 main shaft 10*h*1 main shaft through-hole 10*h*2 discharge hole 20 shaft cap 20*h* shaft cap blind hole 30 inner cylinder 30*h*1 central hole 30*h*2 communication hole

1 main shaft 1*h*1 main shaft through-hole 1*h*11 first axial section 1*h*12 second axial section 1*h*13 intermediate section 1*h*2 discharge hole 2 shaft cap 21 flange portion 22 mounting portion 2*h* shaft cap blind hole 3 inner cylinder 31 one axial end portion of inner cylinder 32 the other axial end portion of inner cylinder 3*h*1 central hole 3*h*2 communication hole 4 first sealing ring 5 second sealing ring RO rotor S intermediate space A axial direction R radial direction

DETAILED DESCRIPTION OF EMBODIMENTS

Exemplary embodiments of the present application are described below with reference to the accompanying drawings. It should be understood that these specific descriptions are only used to teach those skilled in the art how to implement the present application, and are neither intended to be exhaustive of all possible variations of the present application nor to limit the scope of the present application.

As shown in FIG. 1A, in a possible design of an e-axle driving system, a rotor RO of a motor is mounted to a main shaft 10 of a transmission mechanism and is anti-torsion connected with the main shaft 10 of the transmission mechanism. A cooling flow path, for a cooling medium such as oil to flow therein, is formed in the transmission mechanism, and the rotor RO of the motor can be cooled by the cooling medium, thereby improving the heat dissipation capacity of the motor.

Figure 1B:
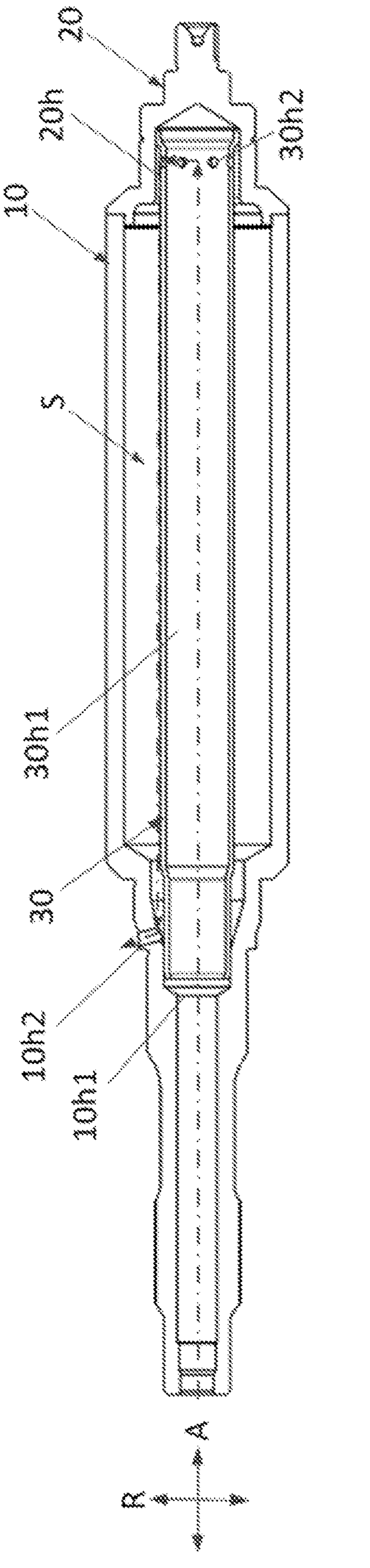
FIG. 1B is a schematic cross-sectional view of the transmission mechanism in FIG. 1A, where a dash-dot line with arrows indicates a flow direction of a cooling medium in a cooling flow path.

As shown in FIG. 1B, the transmission mechanism includes a main shaft 10, a shaft cap 20 and an inner cylinder 30 which are assembled together. A main shaft through-hole 10*h*1 is formed in the main shaft 10. An opening of the main shaft through-hole 10*h*1 at one axial end portion (a left end portion in FIG. 1B) of the main shaft 10 is used as an inlet for the cooling medium. In addition, a discharge hole 10*h*2 is formed in a wall of the main shaft 10 for forming the main shaft through-hole 10*h*1. The shaft cap 20 is fixed to the other axial end portion of the main shaft 10 by interference fit, and seals an opening of the main shaft through-hole 10*h* at the other axial end portion (a right end portion in FIG. 1B) of the main shaft 10. A shaft cap blind hole 20*h* formed in the shaft cap 20 is in communication with the main shaft through-hole 10*h*1. The inner cylinder 30 is mounted in a space surrounded by the main shaft 10 and the shaft cap 20, and is arranged coaxially with the main shaft 10 and the shaft cap 20. Most of the inner cylinder 30 including one axial end portion of the inner cylinder is located in the main shaft through-hole 10*h*1, and the rest of the inner cylinder 30 including the other axial end portion of the inner cylinder is located in the shaft cap blind hole 20*h* of the shaft cap 20. An intermediate space S is formed between an outer circumferential wall of the inner cylinder 30 and an inner circumferential wall of the main shaft 10. A central hole 30*h*1 extending along an axial direction A and a communication hole 30*h*2 communicating the central hole 30*h*1 with the intermediate space S are formed in the inner cylinder 30. In this way, the cooling medium flows in the cooling flow path in a direction indicated by the dash-dot line with arrows in FIG. 1B. When the cooling medium flows through the intermediate space S, it takes away the heat of the rotor RO of the motor, thereby achieving the purpose of cooling.

In the transmission mechanism, in order to realize the cooling flow path for the flow of cooling medium in the transmission mechanism, the whole one axial end portion of the inner cylinder 30 and the main shaft 10 are fixed and sealed by interference fit, and the whole other axial end portion of the inner cylinder 30 and the shaft cap 20 are fixed and sealed by interference fit. As such, regions of the two axial end portions of the inner cylinder 30 for achieving interference fit, and corresponding regions of the main shaft 10 and the shaft cap 20 need high machining accuracy, so that the processing cost of components is high, and the assembly process is complicated and takes a long time.

In view of the above-mentioned situation, the following embodiments are further provided.

It should be understood that although some disadvantages of the transmission mechanism shown in FIG. 1A and FIG. 1B have been described above, at least some aspects or features thereof are still novel and advantageous compared with some prior arts, and FIG. 1A, FIG. 1B and the above description still constitute a part of the innovative embodiments of the present application.

In the present application, unless otherwise specified, "axial direction", "radial direction" and "circumferential direction" refer to the axial direction, radial direction and circumferential direction of the main shaft in the shaft assembly, respectively; "one axial end portion" of each component refers to the left end portion of the component in FIG. 2 to FIG. 4, and "the other axial end portion" of each component refers to the right end portion of the component in FIG. 2 to FIG. 4; and "radial outer side" refers to the side away from a central axis of the main shaft in the radial direction, and "radial inner side" refers to the side close to the central axis of the main shaft in the radial direction.

In the present application, the "anti-torsion connection" refers to a connection between two components that can transmit torque, and these two components can rotate together during transmission of torque.

A structure of a transmission mechanism according to an embodiment of the present application will be described with reference to the accompanying drawings of the specification.

As shown in FIG. 2 to FIG. 5, a transmission mechanism having a cooling flow path according to an embodiment of the present application includes a shaft assembly (a main shaft 1 and a shaft cap 2), an inner cylinder 3 and two sealing rings (a first sealing ring 4 and a second sealing ring 5). The shaft assembly and the inner cylinder 3 are assembled together to form the cooling flow path, for a cooling medium to flow therein, in the transmission mechanism.

In this embodiment, as shown in FIG. 2 to FIG. 5, the shaft assembly is composed of the main shaft 1 and the shaft cap 2. The main shaft 1 and the shaft cap 2 are fixed to each other and form a shaft hole inside the shaft assembly.

Figure 2:
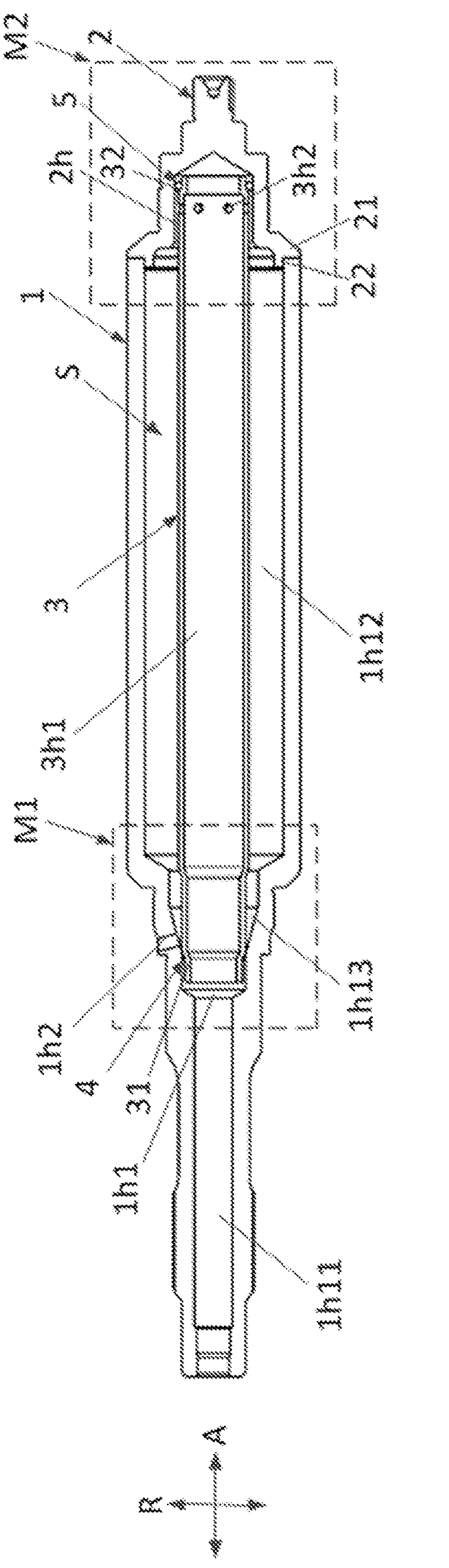
FIG. 2 is a schematic cross-sectional view of a transmission mechanism having a cooling flow path according to an embodiment of the present application, wherein the transmission mechanism can be applied to an e-axle driving system instead of the transmission mechanism in FIG. 1B.
Figure 3:
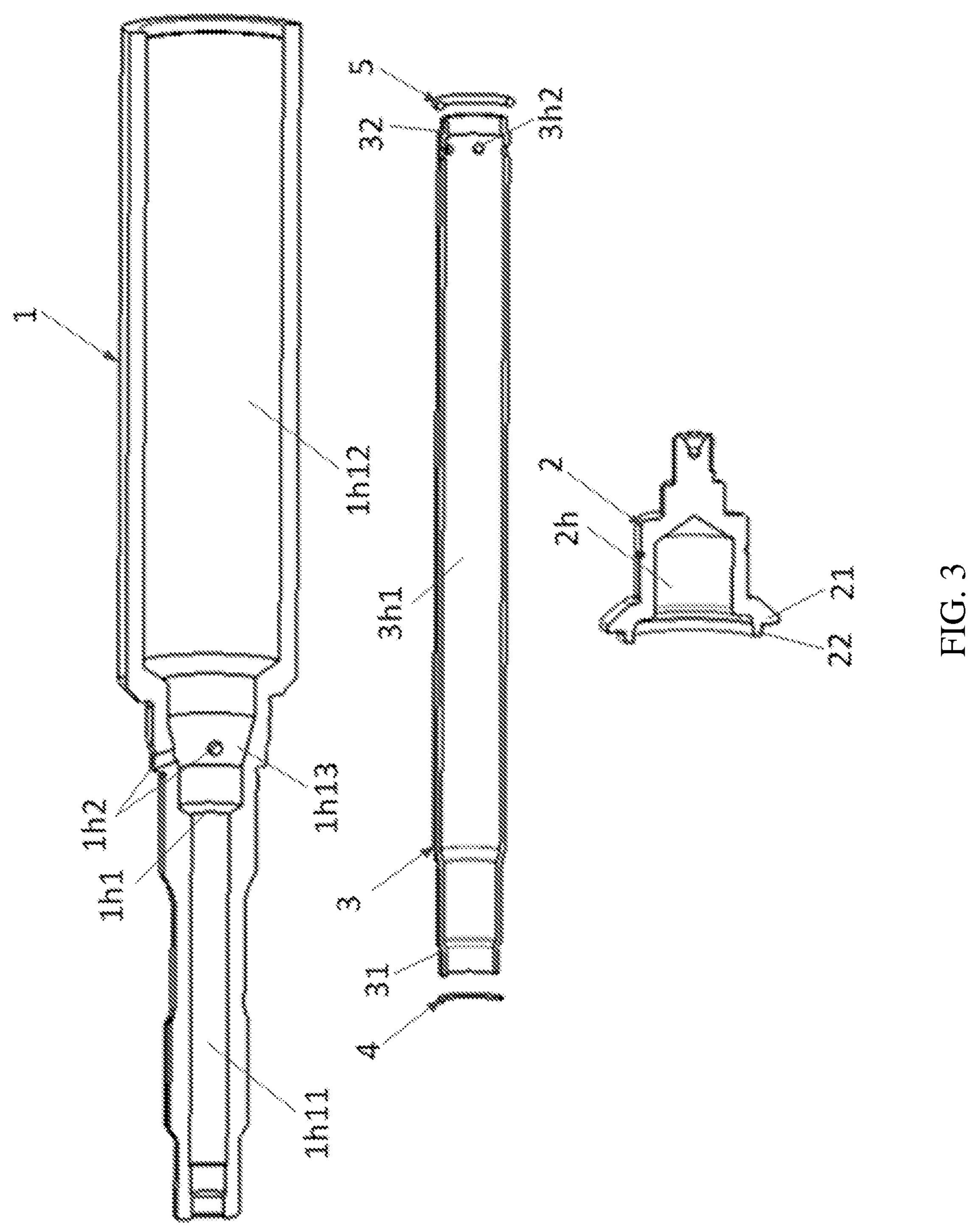
FIG. 3 is a schematic exploded view of the transmission mechanism having the cooling flow path in FIG. 2.
Figure 4:
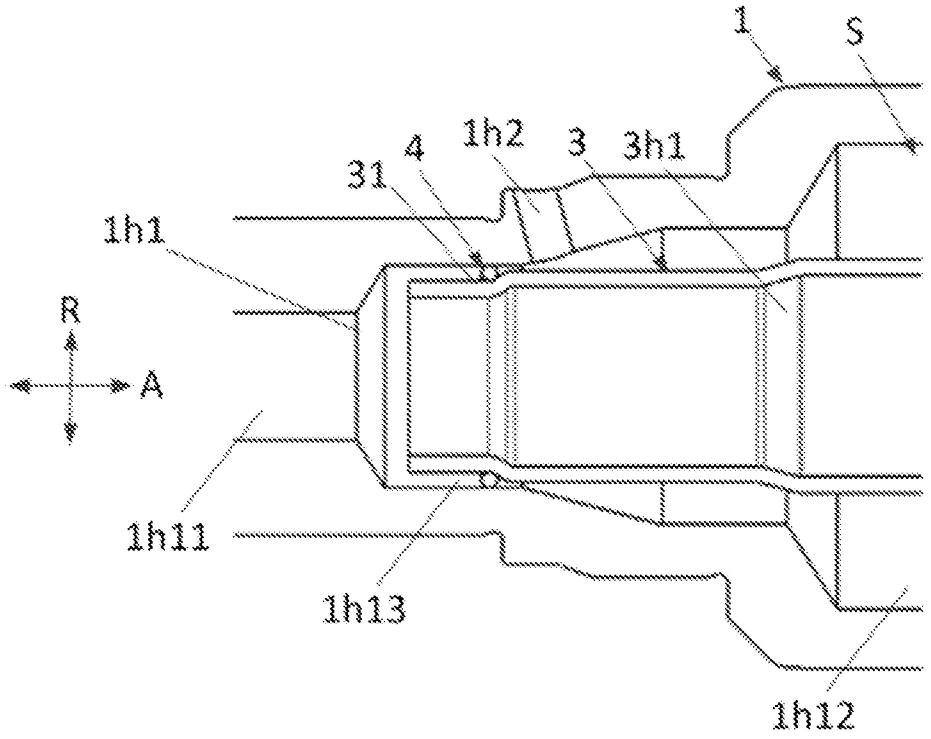
FIG. 4 is a schematic enlarged view of region M1 of the transmission mechanism having the cooling flow path in FIG. 2.

Specifically, in this embodiment, as shown in FIG. 2 to FIG. 5, a main shaft through-hole 1*h*1 extending along an axial direction A is formed in the main shaft 1. An opening of the main shaft through-hole 1*h*1 at one axial end portion of the main shaft 1 is used as an inlet for the cooling medium to enter the transmission mechanism, and an opening of the main shaft through-hole 1*h*1 at the other axial end portion of the main shaft 1 is used as a mounting port for inserting the inner cylinder 3 into the main shaft through-hole 1*h*1. From the one axial end portion of the main shaft 1 to the other axial end portion of the main shaft 1 (that is, from the inlet to the mounting port), the main shaft through-hole 1*h*1 includes a first axial section 1*h*11, an intermediate section 1*h*13, and a second axial section 1*h*12 which are in communication with one another. Across-sectional area of the main shaft through-hole 1*h*1 increases in stages as the main shaft through-hole 1*h*1 passes through the first axial section 1*h*11, the intermediate section 1*h*13 and the second axial section 1*h*12. The cross-sectional area of the first axial section 1*h*11 is substantially the same over its entire axial length. The cross-sectional area of the second axial section 1*h*12 is substantially the same over its entire axial length. As shown in FIG. 4, the cross-sectional area of the intermediate section 1*h*13 is different at different parts of the intermediate section 1*h*13. In some parts, the cross-sectional area of the intermediate section 1*h*13 gradually increases toward the second axial section 1*h*12, while in some other parts, the cross-sectional area of the intermediate section 1*h*13 remains unchanged.

Multiple discharge holes 1*h*2 extending obliquely relative to a radial direction R are formed in the main shaft 1. The multiple discharge holes 1*h*2 are evenly spaced apart in a circumferential direction of the main shaft 1, and are located at the intermediate section 1*h*13 of the main shaft through-hole 1*h*1 and extend through a wall of the main shaft 1. In this way, the discharge holes 1*h*2 are in communication with the intermediate section 1*h*13 of the main shaft through-hole 1*h*1.

Figure 5:
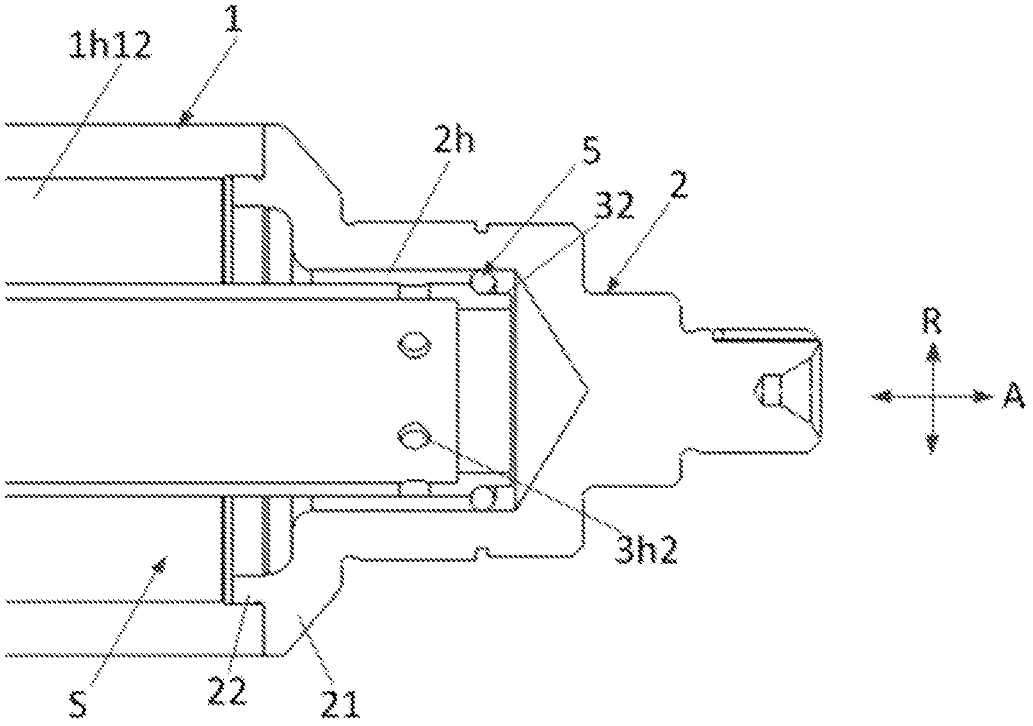
FIG. 5 is a schematic enlarged view of region M2 of the transmission mechanism having the cooling flow path in FIG. 2.

Further, in this embodiment, as shown in FIG. 2, FIG. 3 and FIG. 5, the shaft cap 2 is arranged coaxially with the main shaft 1, and the shaft cap 2 is fixed at the other axial end portion of the main shaft 1 by interference fit, so as to seal the opening of the main shaft through-hole 1*h*1 at the other axial end portion of the main shaft 1.

The shaft cap 2 includes a flange portion 21 that fits with the other axial end portion of the main shaft 1, and the flange portion 21 abuts against the other axial end portion of the main shaft 1. The shaft cap 2 is provided with a mounting portion 22 protruding toward the main shaft 1 on a radial inner side of the flange portion 21. The mounting portion 22 extends into the second axial section 1*h*12 of the main shaft through-hole 1*h*1 and is fixed to the main shaft 1 by interference fit, thereby sealing the opening of the main shaft through-hole 1*h*1 at the other axial end portion of the main shaft 1.

A shaft cap blind hole 2*h* in communication with the main shaft through-hole 1*h*1 is formed in the shaft cap 2. In a state that the shaft cap 2 is fixed to the main shaft 1, the main shaft through-hole 1*h*1 is in communication with the shaft cap blind hole 2*h* to together constitute a shaft hole of the shaft assembly.

Further, in this embodiment, as shown in FIG. 2 to FIG. 5, the whole inner cylinder 3 is cylindrical. The inner cylinder 3 is arranged coaxially with the main shaft 1 and the shaft cap 2. The inner cylinder 3 is inserted in a space surrounded by the main shaft 1 and the shaft cap 2, and is fixed relative to the main shaft 1 and the shaft cap 2. In this way, after the inner cylinder 3 is mounted in place, an intermediate space S is formed between an outer circumferential wall of the inner cylinder 3 and an inner circumferential wall of the main shaft 1, which is mainly located in the second axial section 1*h*12 and the intermediate section 1*h*13 of the main shaft through-hole 1*h*1.

A part of the inner cylinder 3 including one axial end portion 31 extends into the intermediate section 1*h*13 of the main shaft through-hole 1*h*1, and a gap is formed, in the radial direction R, between the part and the main shaft 1. A part of the inner cylinder 3 including the other axial end portion 32 extends into the shaft cap blind hole 2*h* of the shaft cap 2, and a gap is formed, in the radial direction R, between the part and the shaft cap 2. A first stepped structure for mounting the first sealing ring 4 is formed on the outer circumferential wall at the one axial end portion 31 of the inner cylinder 3, and the first stepped structure can limit an axial position of the first sealing ring 4. A second stepped structure for mounting the second sealing ring 5 is formed on the outer circumferential wall at the other axial end portion 32 of the inner cylinder 3, and the second stepped structure can limit an axial position of the second sealing ring 5.

In addition, a central hole 3*h*1 extending through the inner cylinder 3 along the axial direction A is formed inside the inner cylinder 3. An opening of the central hole 3*h*1 at the one axial end portion 31 of the inner cylinder 3 is opposite to the first axial section 1*h*11 of the main shaft through-hole 1*h*1. A cross-sectional area of the first axial section 1*h*11 at the other axial end portion is smaller than a cross-sectional area of the inner cylinder 3 at the one axial end portion 31, so that the inner cylinder 3 cannot be inserted into the first axial section 1*h*11 and the cooling medium flowing through the first axial section 1*h*11 can easily enter the central hole 3*h*1 directly. A communication hole 3*h*2 extends through a wall of the central hole 3*h*1 and is formed in a part of the inner cylinder 3 inserted into the shaft cap blind hole 2*h* of the shaft cap 2.

Further, in this embodiment, the two sealing rings 4 and 5 include a first sealing ring 4 and a second sealing ring 5 made of an elastic material such as rubber. As shown in FIG. 4, the first sealing ring 4 is located at the stepped structure of the one axial end portion 31 of the inner cylinder 3 and in a gap between the one axial end portion 31 of the inner cylinder 3 and the main shaft 1. An inner diameter of the first sealing ring 4 is smaller than an outer diameter of the one axial end portion 31 of the inner cylinder 3. The first sealing ring 4 is squeezed by the inner cylinder 3 and the main shaft 1, and the first sealing ring 4 is closer to the one axial end portion of the main shaft 1 than the discharge hole 1*h*2. As such, the first sealing ring 4 can seal the gap between the one axial end portion 31 of the inner cylinder 3 and the main shaft 1, so that the cooling medium entering the first axial section 1*h*11 through the inlet is not directly discharged from the discharge hole through the gap, but enters the central hole 3*h*1 of the inner cylinder 3. As shown in FIG. 5, the second sealing ring 5 is located at the stepped structure of the other axial end portion 32 of the inner cylinder 3 and in a gap between the other axial end portion 32 of the inner cylinder 3 and the main shaft 1. An inner diameter of the second sealing ring 5 is smaller than an outer diameter of the other axial end portion 32 of the inner cylinder 3. The second sealing ring 5 is squeezed by the inner cylinder 3 and the main shaft 1, and the second sealing ring 5 is farther away from the one axial end portion of the main shaft 1 than the discharge hole 1*h*2. As such, the second sealing ring 5 can seal the gap between the other axial end portion 32 of the inner cylinder 3 and the main shaft 1, so that the cooling medium flowing into the gap between the other axial end portion 32 of the inner cylinder 3 and the main shaft 1 through the communication hole 3*h*2 of the inner cylinder 3 flows into the intermediate space S instead of directly returning back to the central hole 3*h*1 through the opening at the other axial end portion 32 of the inner cylinder 3.

By using the above structure, the cooling flow path for the cooling medium to flow therein is formed inside the transmission mechanism. In the cooling flow path, the intermediate space S is in communication with the space outside the main shaft 1 through the discharge hole 1*h*2, and the central hole 3*h*1 is in communication with the intermediate space S through the communication hole 3*h*2, so that the cooling medium entering from the inlet can be discharged out of the transmission mechanism through the central hole 3*h*1, the communication hole 3*h*2, the intermediate space S and the discharge hole 1*h*2. In this way, the cooling medium flows in and out on the same side (the left side in FIG. 2) and flows over the entire length of the main shaft 1, so as to cool the components over the entire length of the main shaft.

Further, an e-axle driving system including the above-mentioned transmission mechanism is provided according to the present application. The e-axle driving system includes a housing, a transmission and a motor. The housing includes a first space and a second space spaced from each other. The transmission is accommodated in the first space, and the motor is accommodated in the second space. An extending length of the main shaft 1 of the transmission mechanism is such set that one part of the main shaft 1 is located in the first space and the other part is located in the second space. The inlet and the discharge hole 1*h*2 of the transmission mechanism are both formed in the part, located in the first space, of the main shaft 1 (that is, located in the first space), so that the inlet and the discharge hole 1*h*2 are in communication with the first space. The rotor of the motor is anti-torsion connected with the part of the transmission mechanism located in the second space. Specifically, the part, corresponding to the second axial section 1*h*12 of the main shaft through-hole 1*h*1, of the main shaft 1 of the transmission mechanism is in interference fit with the rotor of the motor, so as to realize the anti-torsion connection between the two.

In this way, when the e-axle driving system operates, the rotor drives the transmission mechanism to rotate together. As shown in FIG. 2, oil collected from the first space, as a cooling medium, enters the cooling flow path of the transmission mechanism, and the cooling medium entering from the inlet can return to the first space through the central hole 3*h*1, the communication hole 3*h*2, the intermediate space S and the discharge holes 1*h*2. Therefore, the collected oil from the first space can effectively cool the rotor mounted to the transmission mechanism and located in the second space, thereby improving the heat dissipation capacity of the motor.

The present application is not limited to the above-mentioned embodiments, and those skilled in the art could make various modifications to the above-mentioned embodiments under the teaching of the present application without departing from the scope of the present application. In addition, the following should also be noted.

i. It has been described in the above embodiments that the shaft assembly is composed of the separate main shaft 1 and shaft cap 2 which are fixed together. However the present application is not limited thereto. It can be understood that the shaft assembly may be of an integral structure, and a shape and size of the shaft hole inside the shaft assembly may be modified as needed, so as to facilitate installation of the inner cylinder 3 inside the shaft assembly.

ii. It can be understood that a shape of the central hole 3*h*1 of the inner cylinder 3 may be a shape in which the cross-sectional area gradually increases from the one axial end portion of the inner cylinder 3 toward the other axial end portion of the inner cylinder 3, and a shape of the second axial section 1$h$12 of the main shaft through-hole 1$h$1 of the main shaft 1 may be a shape in which the cross-sectional area gradually increases from the other axial end portion of the main shaft 1 toward the one axial end portion of the main shaft 1, thereby promoting the flow of the cooling medium in the cooling flow path by using centrifugal force during the rotation of the transmission mechanism.

iii. It can be understood that the sealing rings 4 and 5 in the present application have different functions compared with the sealing rings generally used only for sealing. In the present application, the sealing rings 4 and 5 also have the function of positioning the two axial end portions of the inner cylinder 3, so that it is unnecessary to perform high-accuracy machining on the two axial end portions of the inner cylinder 3 and the corresponding mounting or positioning parts of the main shaft 1. The processing cost of the components can be reduced, and the assembly process is simple and takes less time due to the absence of interference fit (between the two axial end portions of the inner cylinder 3 and the corresponding mounting or positioning parts of the main shaft 1).

It can be seen from the above description that in the present application, stepped structures, instead of general sealing ring mounting structures such as grooves for accommodating the sealing rings, are formed at the two axial end portions of the inner cylinder 3, so that the processing of the inner cylinder 3 is convenient, especially for the thin-walled inner cylinder 3.

It can be understood that in the present application, the main function of the second sealing ring 32 at the other axial end portion 32 of the inner cylinder 3 is not sealing, and the second sealing ring 32 is not necessary from a sealing perspective. That is because even without the second sealing ring 32, the fluid will still flow through the central hole 3$h$1 and the communication hole 3$h$2 into the intermediate space S due to the pressure difference in the fluid. The main function of the second sealing ring 32 is to facilitate the mounting and positioning of the part of the inner cylinder 3 including the other axial end portion 32 in the shaft cap blind hole 2$h$ of the shaft cap 2.

It can be understood that the cross sections of the first sealing ring 4 and the second sealing ring 5 herein are not limited to a circular shape, but may be in other shapes such as rectangles or rounded rectangles, and axial width thereof may be larger than radial thickness thereof, thereby facilitating the positioning of the two end portions of the inner cylinder 3 by means of the sealing rings.

iv. The e-axle driving system according to the present application is not limited to pure electric vehicles, but may also serve as a portion of a hybrid power system to be used for hybrid power vehicles.

The invention claimed is:

1. A transmission mechanism having a cooling flow path, comprising:

a shaft assembly, wherein a shaft hole and a discharge hole are formed in the shaft assembly, the shaft hole extends along an axial direction of the shaft assembly, an inlet of the shaft hole is formed at one axial end portion of the shaft assembly, and the discharge hole extends through a wall of the shaft hole;

an inner cylinder, wherein the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along the axial direction of the inner cylinder and is in communication with the inlet, and the communication hole extends through a wall of the central hole; and a first sealing ring and a second sealing ring, wherein the first sealing ring is located in a gap between one axial end portion of the inner cylinder and the shaft assembly, and the second sealing ring is located in a gap between an other axial end portion of the inner cylinder and the shaft assembly, wherein the intermediate space is in communication with a space outside the shaft assembly through the discharge hole, and the central hole is in communication with the intermediate space through the communication hole, so that a cooling medium entering from the inlet is discharged out of the shaft assembly through the central hole, the communication hole, the intermediate space and the discharge hole.

2. The transmission mechanism having the cooling flow path according to claim 1, wherein, at least one of a first stepped structure is formed on the outer circumferential wall at the one axial end portion of the inner cylinder, and the first sealing ring is located at the first stepped structure; or, a second stepped structure is formed on the outer circumferential wall at the other axial end portion of the inner cylinder, and the second sealing ring is located at the second stepped structure.

3. The transmission mechanism having the cooling flow path according to claim 1, wherein the inner cylinder is arranged coaxially with the shaft assembly.

4. The transmission mechanism having the cooling flow path according to claim 1, wherein the shaft assembly comprises a main shaft and a shaft cap, wherein a main shaft through-hole extending along the axial direction of the main shaft is formed in the main shaft, and an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

5. The transmission mechanism having the cooling flow path according to claim 4, wherein the main shaft through-hole comprises a first axial section, an intermediate section and a second axial section which are arranged from the one axial end portion of the main shaft to the other axial end portion of the main shaft and are in communication with one another, and a cross-sectional area of the main shaft through-hole increases in stages as the main shaft through-hole passes through the first axial section, the intermediate section and the second axial section, the discharge hole is in communication with the intermediate section, a part of the inner cylinder comprising the one axial end portion extends into the intermediate section, and the first sealing ring is closer to the one axial end portion of the main shaft than the discharge hole.

6. The transmission mechanism having the cooling flow path according to claim 4, wherein a shaft cap blind hole in communication with the main shaft through-hole is formed in the shaft cap, a part of the inner cylinder comprising the other axial end portion extends into the shaft cap blind hole, the communication hole is located in the shaft cap blind hole, and the second sealing ring is farther away from the one axial end portion of the main shaft than the communication hole.

7. The transmission mechanism having the cooling flow path according to claim 6, wherein a gap is formed, in a radial direction, between a part of the inner cylinder comprising the one axial end portion and the main shaft, and another gap is formed, in the radial direction, between a part of the inner cylinder comprising the other axial end portion and the shaft cap.

8. An e-axle driving system, comprising:

a transmission mechanism having a cooling flow path, wherein the transmission includes:

a shaft assembly, wherein a shaft hole and a discharge hole are formed in the shaft assembly, the shaft hole extends along an axial direction of the shaft assembly an inlet of the shaft hole is formed at one axial end portion of the shaft assembly, and the discharge hole extends through a wall of the shaft hole;

an inner cylinder, wherein the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along the axial direction of the inner cylinder and is in communication with the inlet, and the communication hole extends through a wall of the central hole; and a first sealing ring and a second sealing ring, wherein the first sealing ring is located in a gap between one axial end portion of the inner cylinder and the shaft assembly, and the second sealing ring is located in a gap between an other axial end portion of the inner cylinder and the shaft assembly, wherein the intermediate space is in communication with a space outside the shaft assembly through the discharge hole, and the central hole is in communication with the intermediate space through the communication hole, so that a cooling medium entering from the inlet is discharged out of the shaft assembly through the central hole, the communication hole, the intermediate space and the discharge hole.

9. The e-axle driving system according to claim 8, wherein, at least one of a first stepped structure is formed on the outer circumferential wall at the one axial end portion of the inner cylinder, and the first sealing ring is located at the first stepped structure; or, a second stepped structure is formed on the outer circumferential wall at the other axial end portion of the inner cylinder, and the second sealing ring is located at the second stepped structure.

10. The e-axle driving system according to claim 8, wherein the inner cylinder is arranged coaxially with the shaft assembly.

11. The e-axle driving system according to claim 8, wherein the e-axle driving system further comprises a housing, a transmission and a motor, wherein the housing comprises a first space and a second space spaced from each other, the transmission is accommodated in the first space, the motor is accommodated in the second space, both the inlet and the discharge hole are located in the first space, and a rotor of the motor is anti-torsion connected with a part of the transmission mechanism located in the second space.

12. The e-axle driving system according to claim 11, wherein at a part corresponding to the second axial section of the main shaft through-hole, the main shaft of the transmission mechanism is anti-torsion connected with the rotor of the motor.

13. The e-axle driving system according to claim 8, wherein the shaft assembly comprises a main shaft and a shaft cap, wherein a main shaft through-hole extending along the axial direction of the main shaft is formed in the main shaft, and an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

14. The e-axle driving system according to claim 13, wherein the main shaft through-hole comprises a first axial section, an intermediate section and a second axial section which are arranged from the one axial end portion of the main shaft to the other axial end portion of the main shaft and are in communication with one another, and a cross-sectional area of the main shaft through-hole increases in stages as the main shaft through-hole passes through the first axial section, the intermediate section and the second axial section, the discharge hole is in communication with the intermediate section, a part of the inner cylinder comprising the one axial end portion extends into the intermediate section, and the first sealing ring is closer to the one axial end portion of the main shaft than the discharge hole.

15. The e-axle driving system according to claim 14, wherein a shaft cap blind hole in communication with the main shaft through-hole is formed in the shaft cap, a part of the inner cylinder comprising the other axial end portion extends into the shaft cap blind hole, the communication hole is located in the shaft cap blind hole, and the second sealing ring is farther away from the one axial end portion of the main shaft than the communication hole.

16. E-axle driving system according to claim 15, wherein a gap is formed, in a radial direction, between a part of the inner cylinder comprising the one axial end portion and the main shaft, and another gap is formed, in the radial direction, between a part of the inner cylinder comprising the other axial end portion and the shaft cap.

* * * * *